United States Patent [19]

Cantley

[11] 3,934,488

[45] Jan. 27, 1976

[54] STEERING CONTROL HEAD WITH ADJUSTABLE POSITIONING MEANS

[75] Inventor: George Cantley, Akron, Ohio

[73] Assignee: Rockwell International Corporation, Pittsburgh, Pa.

[22] Filed: Mar. 21, 1975

[21] Appl. No.: 560,579

[52] U.S. Cl. .................................. 74/493; 74/492
[51] Int. Cl.² ........................................ B62D 1/18
[58] Field of Search .................. 74/492, 493, 495

[56] References Cited
UNITED STATES PATENTS

| | | | |
|---|---|---|---|
| 2,926,545 | 3/1960 | Loeffler .............................. | 74/493 |
| 3,269,210 | 8/1966 | Steele, Jr. et al. .................. | 74/492 |
| 3,487,712 | 1/1960 | Steiner ............................... | 74/493 |
| 3,507,165 | 4/1970 | Wilfert et al. ...................... | 74/492 |

Primary Examiner—Allan D. Herrmann

[57] ABSTRACT

A steering control head with adjustable positioning means comprising a housing, a shaft supported in said housing, said shaft operatively attached to a steering system, said housing having thereon a radially extending shoulder, said shoulder having, at least on a part of its outer surface, a series of teeth, a collar having an opening therethrough for fitting over and around said housing, said collar having an annular counterbore surrounding said opening to accept said collar therein, the outer axially extending surface having, at least on a part thereof, a series of teeth for meshing with said teeth on said shoulder, said collar being provided with a fastening means to fasten said collar and said housing intermeshed therewith to a bulkhead member.

14 Claims, 4 Drawing Figures

STEERING CONTROL HEAD WITH ADJUSTABLE POSITIONING MEANS

BACKGROUND OF THE INVENTION

The present invention relates generally to a steering control head with adjustable positioning means. More specifically, the present invention relates to a steering control head particularly adapted for marine and related applications.

The present invention contemplates a steering control head with adjustable positioning means comprising a housing, a shaft rotatably supported in said housing, said shaft operatively attached to a steering system, said housing having thereon a radially extending shoulder, said shoulder having, at least on a part of its outer surface, a series of teeth, a collar having an opening therethrough for fitting over and around said housing, said collar having an annular counterbore surrounding said opening to accept said collar therein, the outer axially extending surface having, at least on a part thereof, a series of teeth for meshing with said teeth on said shoulder, said collar being provided with a fastening means to fasten said collar and said housing intermeshed therewith to a bulkhead member.

There are many different forms and varieties of boat and vehicle designs and, similarly, there are various boat and vehicle manufactures. In many instances, the different models of boats and vehicles have different dashboard configurations to which the various operator mechanisms are attached. Additionally, the areas behind and adjacent to the dashboard or bulkhead areas are somewhat confined and specially designed to accommodate different gauges, radios, heaters, etc. One of the operator mechanisms that must be fitted into the space and correctly positioned on the dashboard is the steering control by which the operator steers the boat or vehicle to which the steering system is operatively attached. Two matters of concern to the installer of the steering system are the areas behind and in front of the dashboard or bulkhead. With respect to the area behind the dashboard, the steering head or control must be so positioned so that it may be effectively attached to its associated steering system. With respect to the area in front of the dashboard, the shaft and the steering wheel which is attached thereto must be positioned such that it is in a convenient and comfortable operating position for the operator.

Furthermore, this positional flexibility should be achieved with a minimum number of parts so as to reduce the overall inventory of the boat or vehicle builder. A limited number of parts also reduces the possibility and probability of incorrect installation and thereby increases the safety characteristics of the steering control head or device.

SUMMARY OF THE INVENTION

It is therefore a primary object of the present invention to provide a steering control head with adjustable positioning means comprising a housing, a shaft rotatably supported in said housing, said shaft operatively attached to a steering system, said housing having thereon a radially extending shoulder, said shoulder having, at least on a part of its outer surface, a series of teeth, a collar having an opening therethrough for fitting over and around said housing, said collar having an annular counterbore surrounding said opening to accept said collar therein, the outer axially extending surface having, at least on a part thereof, a series of teeth for meshing with said teeth on said shoulder, said collar being provided with a fastening means to fasten said collar and said housing intermeshed therewith to a bulkhead member.

It is still another object of the present invention to provide a steering control head with adjustable positioning means wherein said fastening means includes on said collar at least one generally longitudinally extending hole therethrough to accept bolts for fastening said collar and said housing member intermeshed therewith to a bulkhead member.

It is still another object of the present invention to provide a steering control head with adjustable positioning means wherein said bulkhead member is provided with at least one generally longitudinally extending hole therethrough in registration with said generally longitudinally extending holes through said collar to accept said bolts for attaching said collar and said housing intermeshed therewith to said bulkhead member.

It is still another object of the present invention to provide a steering control head with adjustable positioning means wherein a wedge member is interposed between said collar and said bulkhead member to vary the angle of the housing and said shaft rotatably supported therein with respect to said bulkhead member.

It is still another object of the present invention to provide a steering control head with adjustable positioning means wherein said fastening means includes at least one opening through said collar to accept bolts for fastening said collar and said housing member intermeshed therewith to said bulkhead member.

It is still another object of the present invention to provide a steering control head with adjustable positioning means wherein said bulkhead member is provided with at least one opening extending therethrough in registration with said opening through said collar to accept bolts for attaching said collar and said housing intermeshed therewith to said bulkhead member.

It is still another object of the present invention to provide a steering control head with adjustable positioning means wherein said wedge member is provided with at least one opening in registration with the openings provided in said collar and said bulkhead member to accept said bolts for attaching said collar and said housing intermeshed therewith to said bulkhead member.

It is still another object of the present invention to provide a steering control head with adjustable positioning means wherein said collar is manufactured from a plastic material.

It is still another object of the present invention to provide a steering control head with adjustable positioning means wherein said wedge member is manufactured from a plastic material.

It is still another object of the present invention to provide a steering control head with adjustable positioning means wherein said series of teeth on the outer axially extending surface of said collar continue in an uninterrupted fashion.

It is still another object of the present invention to provide a steering control head with adjustable positioning means wherein said series of teeth on said shoulder are in two oppositely disposed portions subtending an arc of at least 30°, said series of teeth on said collar and on said shoulder so sized to enable said positional adjustment of said housing with respect to said bulkhead member in approximately 5° increments.

It is still another object of the present invention to provide a steering control head with adjustable positioning means wherein said wedge member is an angular radial section of a cylinder.

It is still another object of the present invention to provide a steering control head with adjustable positioning means wherein said wedge member is provided with an opening therethrough for fitting over and around said housing, said opening in general registration with said opening in said collar.

It is still another object of the present invention to provide a steering control head with adjustable positioning means wherein there are three openings in said collar in registration with three holes in said wedge member which are in turn in registration with three holes in said bulkhead member, said collar having thereon at each of said openings a lock-washer means for locking the head of said bolt in place, said lock-washer means having an opening therethrough in registration with the opening in said collar, both of said openings combined in a frusto-ellipsoid form.

It is still another object of the present invention to provide a steering control head with adjustable positioning means being simplistic in design and adaptable to many and various forms of boat and vehicle dashboard and/or bulkhead configurations.

It is still another object of the present invention to provide a steering control head with adjustable positioning means which can be manufactured using automated high volume techniques.

It is still another object of the present invention to provide a steering control head with adjustable positioning means which can be inexpensively manufactured.

Still other objects, features and attendant advantages of the present invention will become apparent to those having skill in this art from a reading of the following detailed description of the preferred embodiments constructed in accordance therewith, taken in conjunction with the accompanying drawings wherein like numerals designate like parts in the several figures.

DESCRIPTION OF THE INVENTION

Figure 1:
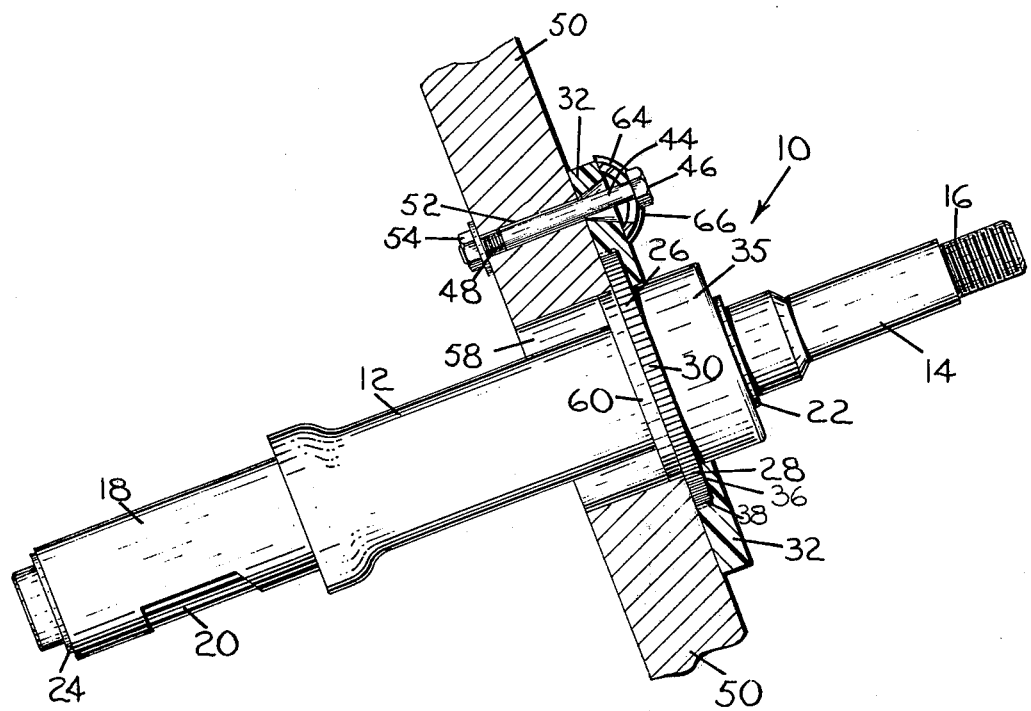
FIG. 1 is a side elevational view partially in section showing a steering control head with adjustable positioning means in accordance with the present invention.
Figure 2:
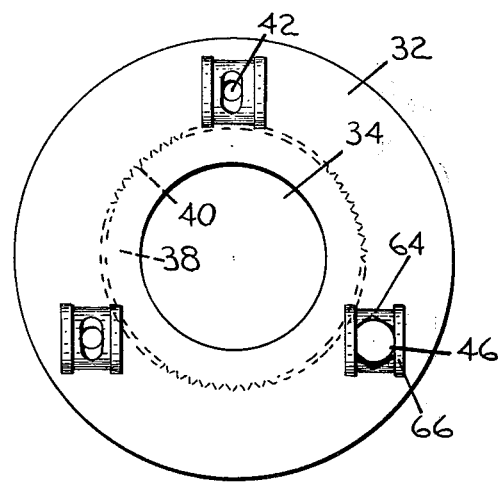
FIG. 2 is a front elevational view of a collar used in connection with the steering control head of FIG. 1.
Figure 3:
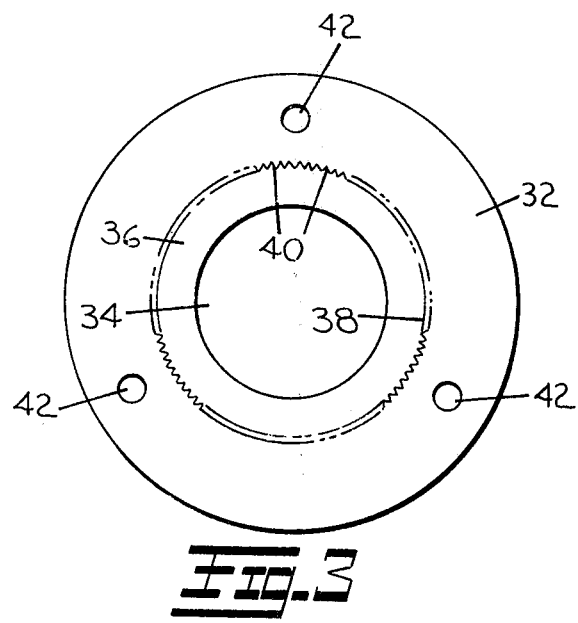
FIG. 3 is a rear elevational view of the collar of FIG. 2.

Referring now to the drawings and in particular to FIGS. 1 through 3, there is therein shown a steering control head 10 that might be used in marine or other vehicular applications. Steering control head 10, in terms of its internal working parts, may be of a number of prior art forms and the present invention does not deal with certain of these operative parts.

The major thrust of the present invention is directed to the adjustable positioning means of the steering control head 10. The control head 10 is provided with a housing 12 which may be formed from a series of parts or may be moulded, machined or otherwise formed from a single part. The housing 12 has rotatably supported therein a shaft 14 which has provided at one end thereof suitable fastening or attaching means such as a threaded portion 16. The threaded portion 16 is adapted to threadably receive a steering wheel or the like (not shown) which may be grasped and/or rotated by the operator. The rotation of the steering wheel which in turn rotates the shaft 14 will actuate the steering system which is operatively attached to the control head 10 at its operative end 18. More specifically, the steering system will be actuated by a gear means 20 which is attached to or formed from shaft 14. The relative annular position of the shaft is maintained within the housing by suitable retaining means such as first clamp 22 and second clamp 24.

The housing 12 has provided thereon a radially extending shoulder 26. The radially extending shoulder 24 may be formed from the same material as the housing or may be fixedly attached to the housing 12 by suitable fastening means such as welding, brazing, threaded screw or the like. The radially extending shoulder 26 is provided with an outer surface 28. The outer surface 28 of the shoulder 26 may be substantially cylindrical in form whose axis is substantially coincident with the rotational axis of the shaft 14. The shoulder 26 is provided with a series of teeth 30 on its outer surface 28. The shoulder teeth 30 may be provided continually or discontinually about the outer surface 28 of the shoulder 26 or may be provided in separate portions which may be oppositely disposed on either side of said outer surface 28. Further, the shoulder teeth 30 may be provided in portions generally subtending an arc of approximately 30° or more.

The steering control head is further provided with a collar 32. The collar 32 can best be seen in FIGS. 2 and 3. The collar 32 may be manufactured from a wide range of materials, including plastics such as Celcon. The collar 32 is provided with an opening 34 centrally therethrough. The collar 32 may be placed over and around the housing 12 at its opening 34. That is, the collar opening 34 is so sized as to generally accommodate the overall outside dimension of the front extension 35 of the housing 12. The collar 32 is further provided with an annular counterbore 36 which generally and uniformly surrounds the collar opening 34. The counterbore is best seen in FIG. 3. The annular counterbore 36 is provided with an axially extending surface 38. That is, the axially extending surface 38 of the annular counterbore 36 extends axially with respect to the axis of rotation of the shaft 14.

The axially extending surface 38 of the annular counterbore 36 is provided with a series of teeth 40. The collar teeth 40 are formed complementary with the shoulder teeth 30 for intermeshing therewith. It can be seen therefore that the collar 32 may be fitted over the front extension 35 of the housing 12 and nested in place over the radially extending shoulder 26 with the shoulder teeth 30 intermeshed with the collar teeth 40. It can also be seen that in the nested position the annular counterbore 36 generally captures the radially extending shoulder 26 such that the inner radially extending surface of the collar is flush with the inner radially extending surface of the shoulder 26.

The collar 32 may also be provided with at least one generally longitudinally extending hole 42. In a typical installation, there will be provided therein three of such holes 42 on the collar. The holes 42 are so sized and adapted to receive suitable fastening means such as bolts 44. The bolts 44 typically are provided with a head 46 and threaded portion 48. The bolts 44 are adapted to fasten or attach the steering control head 10 to a dashboard or bulkhead member 50. The bulkhead member 50 may also be provided with holes 52 to receive the bolts 44. The bolts 44 may have threadably attached thereto a nut 54 which effects the fastening of the control head 10 to the bulkhead member 50. More specifically, the nut and bolt arrangement fastens the collar 32 and the housing 12 which is intermeshed with a collar to the bulkhead member. Therefore, the intermeshing of the collar teeth 40 with the shoulder teeth 30 provides the anti-rotational fastening means and the bolt 44 and nut 54 arrangement which is disposed in the hole 42 in the collar 32 and the bulkhead hole 52 effects the axial fastening means of the head 10 with respect to the bulkhead member 50.

Referring now to the operative end 18 of the housing 12, it can be seen that the gear means 20 is positioned in a particular position with respect to the bulkhead holes 52. As before mentioned, the specific position of the gear means 20 might change from application to application, yet it may be desirable to maintain the overall orientation of the bulkhead holes 52 or certain attachment to the steering control head 10 (not shown). That is, it may become necessary to move the position of the gear means 20 with respect to the bulkhead 50 without disturbing the overall position of the collar 32 and any apparatus or devices attached thereto, such as rudder indicator means or the like. This may be accomplished by simply loosening the nut 54 from the bolt 44 or removing the bolt 44 entirely so that the collar 32 may be removed from the radially extending shoulder 26. Once removed, the housing 12 may be rotated freely to the desired position. Once the desired position of the housing has been reached, the collar 32 can be intermeshed at its collar teeth 40 with the shoulder teeth 30 to fix the rotational position of the housing with respect to the bulkhead member 50.

Figure 4:
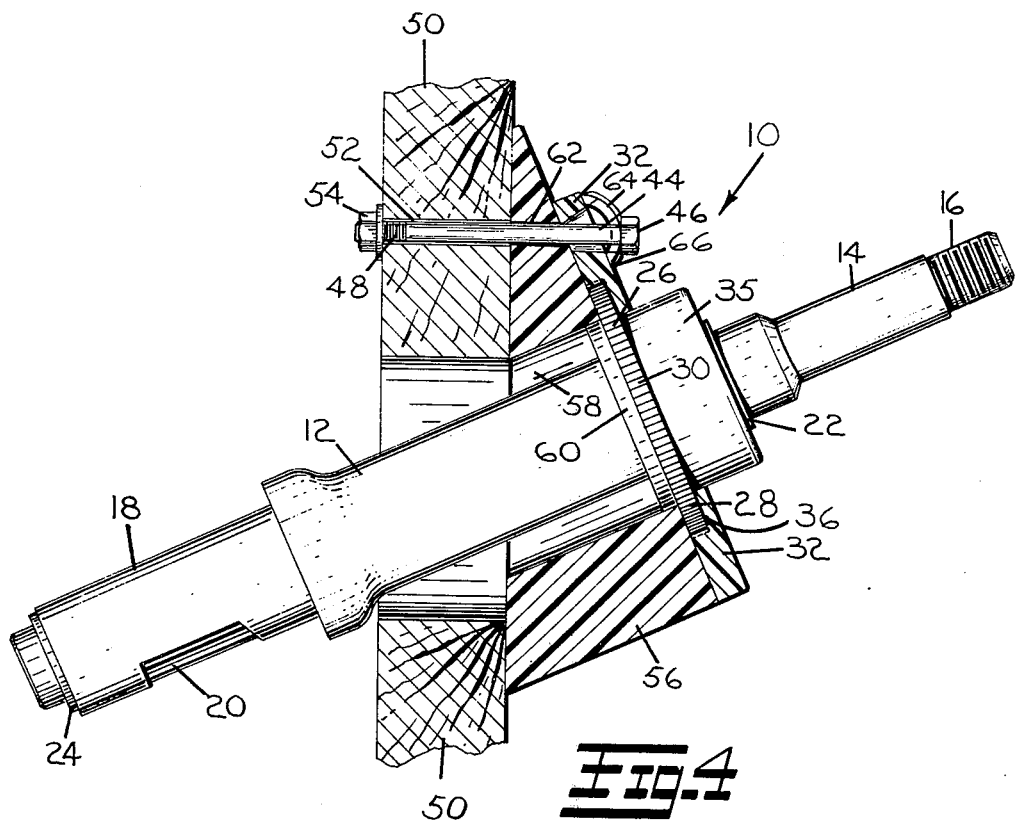
FIG. 4 is a side elevational view partially in section showing a steering control head with adjustable positioning means in accordance with another embodiment of the present invention.

A further embodiment of the present invention is shown in FIG. 4 wherein like parts are denoted by the same reference numerals. The steering control head 10 of FIG. 4 offers an additional dimension of flexibility. In particular, the steering control head 10 may not only have its rotational position changed or modified as indicated and described above with respect to the control head 10 of FIG. 1, but it also may have its angular position with respect to the bulkhead member 50 changed. This may become necessary and desirable in those situations where the dashboard or bulkhead member 50 is so disposed on the boat or vehicle such that the steering control if attached in a generally perpendicular fashion would present a totally undesirable and uncomfortable steering position to the operator. The member which primarily affects the angular adjustability of the steering control head 10 with respect to the bulkhead member 50 is a wedge member 56. The wedge member 56, as with the collar 32, may be manufactured from a wide variety of materials such as the above noted Celcon. The wedge member 56 is adapted to be interposed between the collar 32, the radially extending shoulder 26 and the bulkhead member 50. That is, the wedge member 56 may be thought of as an extension of the bulkhead member 50. The wedge member 56 has a central opening therethrough 58 so sized to be fitted over the operative end 18 of the housing 12. The opening 58 of the wedge member 56 may also be sized as to coaxially accommodate an annular raised portion 60 of the housing 12. The annular raised portion 60 therefore positionally fixes the wedge member 56 on the housing 12. The wedge member 56 may be provided with at least one and typically more than two openings 62. It can be seen that the wedge member holes 62 are formed in the wedge member 56 such that they are in registration with the bulkhead holes 52. Accordingly, the openings or holes 42 in the collar must be suitably sized to accommodate the bolts 44 when they are angularly positioned thereto. It may be said that the shape of the holes 42 are generally frusto-ellipsoid in form. The collar may also be provided with a lock-washer means 64 which accommodates the head 46 of the bolt 44 when it is so angularly disposed with respect to the collar 32. Further, the lockwasher means 64 may be provided with ridges 66 which abut the lands of the bolt head 46 to interlock them therebetween. Therefore, the lock-washer means 66 performs two functions:

1. To rotatably support the head 46 of the bolt 44 when it is annularly disposed to the collar 32; and
2. To mechanically interlock the bulkhead 46 on the lock-washer means 64.

The degree of rotational and/or angular adjustability can be varied upon the size and number of the shoulder teeth 30 and the collar teeth 40 and also with the overall angle of the wedge member. With respect to the latter point, the wedge member may be fashioned from a cylindrical shape. That is, it may be an angular section of a cylinder. Furthermore, a multiplicity of series of wedge member holes 62 may be provided such that the wedge member 56 can be rotated to various positions about the axis of the shaft 14 thereby varying the operational angle of the shaft with respect to the bulkhead 50.

Obviously, the present invention is not limited to the specific details as herein described, but is capable of other modifications and changes without departing from the spirit and scope of the appended claims.

I claim:

1. A steering control head with adjustable positioning means comprising a housing, a shaft rotatably supported in said housing, said shaft operatively attached to a steering system, said housing having thereon a radially extending shoulder, said shoulder having, at least on a part of its outer surface, a series of teeth, a collar having an opening therethrough for fitting over and around said housing, said collar having an annular counterbore surrounding said opening to accept said shoulder therein, the inner axially extending surface of said collar counterbore having, at least on a part thereof, a series of teeth for meshing with said teeth on said shoulder, said collar being provided with a fastening means to fasten said collar and said housing intermeshed therewith to a bulkhead member.

2. A steering control head with adjustable positioning means in accordance with claim 1 wherein said fastening means includes on said collar at least one generally longitudinally extending hole therethrough to accept bolts for fastening said collar and said housing member intermeshed therewith to a bulkhead member.

3. A steering control head with adjustable positioning means in accordance with claim 2 wherein said bulkhead member is provided with at least one generally longitudinally extending hole therethrough in registration with said at least one generally longitudinally extending hole through said collar to accept said bolts for attaching said collar and said housing intermeshed therewith to said bulkhead member.

4. A steering control head with adjustable positioning means in accordance with claim 1 wherein a wedge member is interposed between said collar and said bulkhead member to vary the angle of the housing and said shaft rotatably supported therein with respect to said bulkhead member.

5. A steering control head with adjustable positioning means in accordance with claim 4 wherein said fastening means includes at least one opening through said collar to accept bolts for fastening said collar and said housing member intermeshed therewith to said bulkhead member.

6. A steering control head with adjustable positioning means in accordance with claim 5 wherein said bulkhead member is provided with at least one opening extending therethrough in registration with said opening through said collar to accept bolts for attaching said collar and said housing intermeshed therewith to said bulkhead member.

7. A steering control head with adjustable positioning means in accordance with claim 6 wherein said wedge member is provided with at least one opening in registration with the openings provided in said collar and said bulkhead member to accept said bolts for attaching said collar and said housing intermeshed therewith to said bulkhead member.

8. A steering control head with adjustable positioning means in accordance with claim 1 wherein said collar is manufactured from a plastic material.

9. A steering control head with adjustable positioning means in accordance with claim 4 wherein said wedge member is manufactured from a plastic material.

10. A steering control head with adjustable positioning means in accordance with claim 1 wherein said series of teeth on the inner axially extending surface of said collar continue in an uninterrupted fashion.

11. A steering control head with adjustable positioning means in accordance with claim 1 wherein said series of teeth on said shoulder are in two oppositely disposed portions subtending an arc of at least 30°, said series of teeth on said collar and on said shoulder so sized to enable said positional adjustment of said housing with respect to said bulkhead member in approximately 5° increments.

12. A steering control head with adjustable positioning means in accordance with claim 4 wherein said wedge member is an angular radial section of a cylinder.

13. A steering control head with adjustable positioning means in accordance with claim 4 wherein said wedge member is provided with an opening therethrough for fitting over and around said housing, said opening in general registration with said opening in said collar.

14. A steering control head with adjustable positioning means in accordance with claim 7 wherein there are three openings in said collar in registration with three holes in said wedge member which are in turn in registration with three holes in said bulkhead member, said collar having thereon at each of said openings a lock-washer means for locking the head of said bolt in place, said lock-washer means having an opening therethrough in registration with the opening in said collar, both of said openings combined in a frusto-ellipsoid form.

* * * * *